United States Patent [19]
Scheidel et al.

[11] Patent Number: 6,076,795
[45] Date of Patent: Jun. 20, 2000

[54] RETAINING DEVICE FOR AN ELECTRIC MOTOR

[75] Inventors: Wolfgang Scheidel; Peter Froehlich, both of Buehl; Christof Bernauer, Forbach; Thomas Bertolini, Rheinau; Christoph Eitel, Achern; Josef Foerstera; Peter Nolting, both of Buehlertal; Reuben Agnon, Sasbach; Otto Brass, Buehl; Alfred Maier, Achern, all of Germany

[73] Assignee: Robert Bosch GmbH, Stuttgart, Germany

[21] Appl. No.: 09/171,535

[22] PCT Filed: Jan. 13, 1998

[86] PCT No.: PCT/DE98/00097

§ 371 Date: Feb. 5, 1999

§ 102(e) Date: Feb. 5, 1999

[87] PCT Pub. No.: WO98/37612

PCT Pub. Date: Aug. 27, 1998

[30] Foreign Application Priority Data

Feb. 21, 1997 [DE] Germany ............................ 197 06 852

[51] Int. Cl.[7] ............................ F16M 13/00; H02K 5/24; F16F 1/18
[52] U.S. Cl. ........................ 248/603; 248/604; 248/605; 310/51; 267/158; 267/160
[58] Field of Search .................................. 248/603, 604, 248/605, 606, 629, 672, 674, 634, 638, 590, 608; 310/51, 91; 267/158, 160

[56] References Cited

U.S. PATENT DOCUMENTS

| | | | |
|---|---|---|---|
| 5,237,871 | 8/1993 | Henderson et al. | 248/603 |
| 5,533,704 | 7/1996 | Fischinger et al. | 248/603 |
| 5,786,647 | 3/1994 | Vollmer et al. | 310/51 |

FOREIGN PATENT DOCUMENTS

| | | | |
|---|---|---|---|
| 247745 | 10/1960 | Australia | 248/603 |
| 1380694 | 10/1964 | France | 248/604 |
| 519250 | of 1925 | Germany | 248/603 |

*Primary Examiner*—Ramon O. Ramirez
*Assistant Examiner*—Jerome A. DeLuca
*Attorney, Agent, or Firm*—Ronald E. Greigg; Edwin E. Greigg

[57] ABSTRACT

In known retaining devices for electric motors, rotationally flexible retaining elements on the order of leaf springs are provided between a receiving housing and the electric motor and serve to decouple noise of the electric motor. The novel retaining device for an electric motor includes retaining elements that extend axially between a receiving housing and the motor housing. These retaining elements enable low-frequency decoupling below the frequencies to be decoupled; on the occurrence of natural resonance when the electric motor is turned on and off or there are shocks from outside, the torsional motion of the retaining elements is limited by stop elements. The retaining device is especially well suited to electric motors of blowers.

20 Claims, 2 Drawing Sheets

RETAINING DEVICE FOR AN ELECTRIC MOTOR

The invention is based on a retaining device for an electric motor by the preamble to.

A retaining device for an electric motor is already known (U.S. Pat. No. 4,063,060), in which three rotationally flexible retaining arms on the order of leaf springs are provided. The retaining arms are deployed in radiating fashion between the electric motor and the receiving housing, offset from one another by equal circumferential angles, and are each secured rigidly by one end to the electric motor and by the other end, with the interposition of elastic buffers. The retaining arms are joined to an inlet collar that is firmly connected to the receiving housing. These retaining arms effect an elastic binding of the electric motor to the receiving housing and thus damp the transmission of running noise and operation-dictated vibration of the blower to the receiving housing, caused for instance by imbalance in the blower wheel, so that a considerable reduction in noise development is achieved. By means of the three-point suspension of the electric motor in a single plane and the low spring constant of the retaining arms in the direction of torsion, the motor executes relatively major vibration and tilting motions, which in the elastic elements, especially the buffers, induce shear forces that rapidly cause material fatigue and damage. The service life of this known retaining device is therefore relatively limited and is inadequate for use in motor vehicles, in which the elastic elements must also absorb vibration caused by shocks from the roadway to the electric motor.

In one such retaining device in accordance with U.S. Pat. No. 4,161,667, the retaining arms on the order of leaf springs each have a respective axial portion, between their two ends, that extends in the direction of the motor pivot axis.

A retaining device is also known (German Utility Model DE 91 08 745 U1) with a receiving housing into the receiving opening of which a motor housing of an electric motor protrudes. An intermediate bush is slipped onto the motor housing with radial spacing and is firmly retained by spring tongues. Between the receiving housing and the intermediate bush, a retaining body made of plastic is fastened; with an encompassing annular part it engages the receiving housing and the intermediate bush, and its three arm portions beginning at the annular part and extending axially rest on the receiving housing and, with a radial end portion, engage the intermediate bush.

German Patent Disclosure DE 27 27 119 A1 also discloses a retaining device in which spring-elastic retaining elements are joined on one end to a tubular retaining ring that force-lockingly engages the motor housing.

An object of the invention is to create a retaining device in which noise decoupling of the electric motor is done at such low frequencies that the resonant frequency of the spring-mass system formed by the electric motor and the retaining device is below the frequencies of the electric motor to be decoupled; even in rough operation in the motor vehicle, excessive stress on the retaining device does not occur, thus guaranteeing a long service life for the retaining device.

By disposing one stop element in the region of each retaining element, which stop element limits the amplitude of the vibrational motion of the retaining elements relative to the receiving housing, it is assured that in the case of resonance, for instance upon starting of the electric motor and when it is turned off or upon acceleration from outside from impacts and shocks, the maximum possible deflection of the electric motor relative to the receiving housing is limited, thus precluding excessive strain on the retaining device.

It is advantageous that by the disposition of two stop faces facing one another, the amplitude of the torsional motion of the retaining elements relative to the receiving housing upon a clockwise or counterclockwise rotation is limited.

It is also advantageous that the two stop faces, facing one another in the direction of the rotary motion, of the stop elements extend in such a way, in particular with a curved course, that upon a vibrational motion a first portion of the axial portion, oriented toward the first end of the retaining element, comes to rest with a greater amplitude on one of the stop faces than a second portion oriented toward the second end; as a result the spring rate of the retaining elements increases, in particular progressively, with increasing deflection, and thus the resonant rise is reduced. It is also advantageous to embody the axial portions of the retaining elements with a rectangular cross section and to subdivide the axial portion by means of a transposition into a first subportion, which is oriented toward the first end, and a second subportion, which is oriented toward the second end, and in the first subportion the transverse sides and in the second subportion the longitudinal sides of the rectangular cross section face the motor housing and the receiving housing, as a result of which, by this change in the geometry of the retaining elements, the spring rate of the retaining elements in various directions (axially, radially, the torsional direction) can be varied, and an adaptation of the spring characteristics of the retaining elements to decouple the vibration occurring in various directions is possible.

It is also advantageous to embody a transverse stop face on the stop element that is embodied in the region of the second end of the retaining element and that extending toward the first end has a decreasing spacing from the retaining element, in order to limit the maximum vibrational amplitude of the retaining elements in the radial direction.

The integral embodiment of the stop elements on the receiving housing is advantageous in the sense that no additional assembly steps are needed to install the stop elements, while embodying the stop elements as an independent part has the advantage that if there is a need to change the stop geometry, no changes of tools for producing the receiving housing are needed.

The embodiment of the cup-shaped receiving housing with a cylindrical part and a bottom part, and the joining of the retaining elements, extending axially to the motor pivot axis, to a tubular retaining ring and a retaining disk enable an especially compact design of the retaining device.

BRIEF DESCRIPTION OF THE DRAWINGS

Exemplary embodiments of the invention are shown in simplified form in the drawings and described in further detail below.

In FIG. 1, an electric motor 1 is shown that is used in particular as a blower motor in a motor vehicle.

Figure 2:
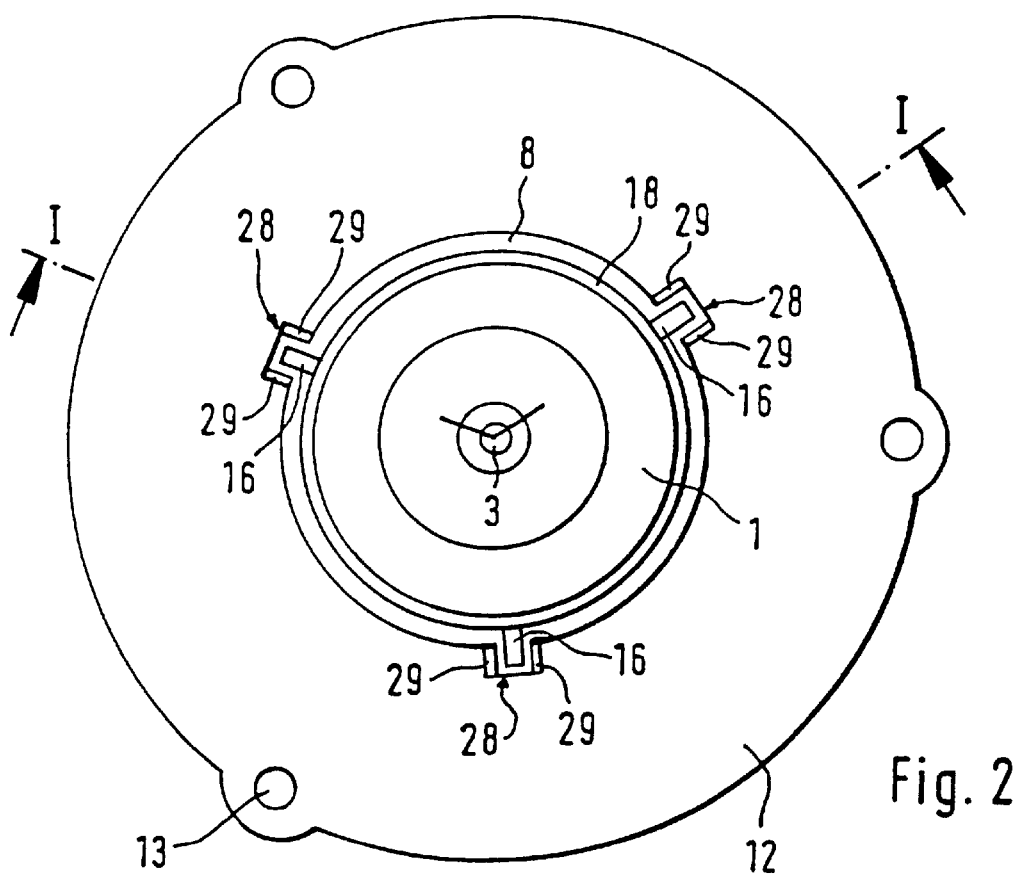
FIG. 2 is a plan view on a retaining device with an electric motor.

The electric motor 1 has a shaft 3, protruding out of a motor housing 2, that is connected to a fan wheel 4 and is supported rotatably about a motor pivot axis 5. The motor housing 2 protrudes at least partway into a receiving opening 8 of a cup-shaped receiving housing 9, which has an annular cylindrical part 10 and a radially extending bottom part 11. As can also be seen in FIG. 2, which shows a plan view without the fanwheel, the receiving housing 9, on its end remote from the bottom part 11 has a retaining flange 12, which begins at the annular cylindrical part 10 and extends radially outward, with fastening openings 13 for fastening (not shown) the receiving housing 9 in the motor vehicle by means of screws.

Figure 1:
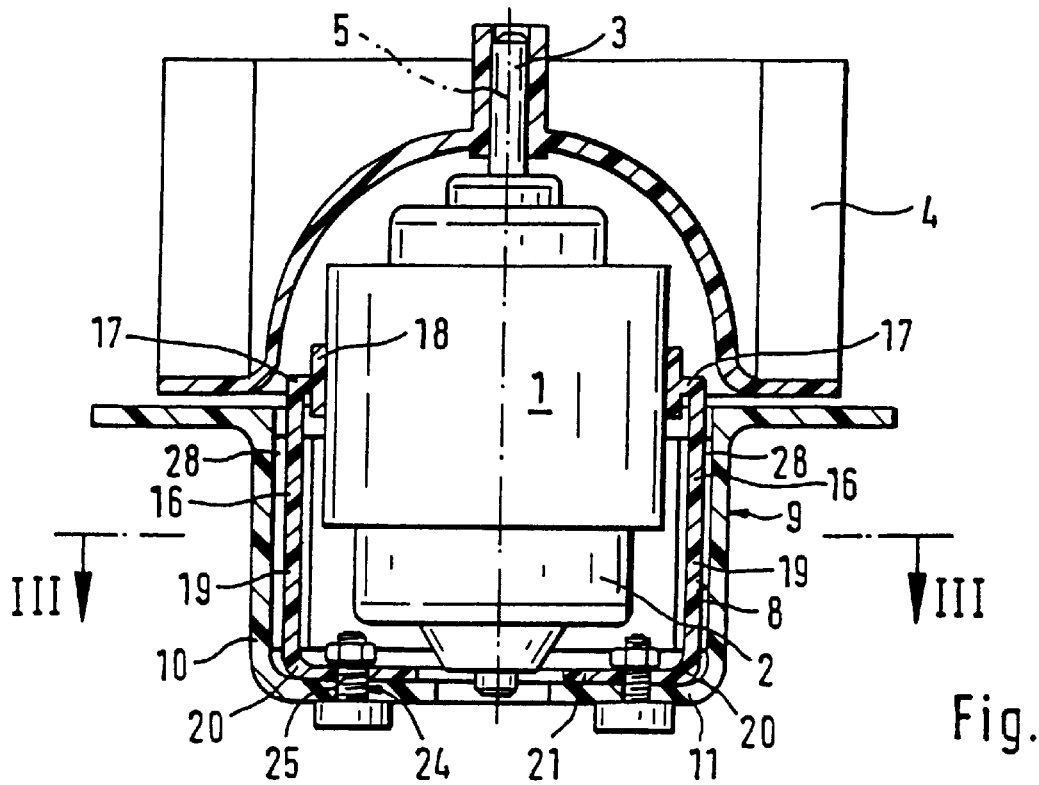
FIG. 1 shows a retaining device with an electric motor along a line I—I of FIG. 2.

The motor housing 2, extending coaxially with the motor pivot axis 5, protrudes with radial spacing into the receiving opening 8 of the receiving housing 9. Extending in this annular interstice, formed by the radial spacing, between the circumference of the motor housing 2 and the wall of the receiving opening 8 are at least three spring-elastic retaining elements 16 that are circumferentially spaced apart from one another and are freely movable; with their first ends 17, located at the top in the view of FIG. 1, they are joined to a tubular retaining ring 18, which embraces the circumference of the motor housing 2 and is secured to the motor housing 2, for instance by shrinkage, gluing, riveting, screwing, or the like. Beginning at the first end 17, an axial portion 19 of the retaining element 16 extends downward, in terms of the view in FIG. 1, as far as a second end 20, which is connected to a respective retaining disk 21 that extends radially inward, parallel to the bottom part 11 of the receiving housing 9. The retaining disk 21, like the bottom part 11, has through openings 24, through which screws 25 are inserted in order to fix the retaining disk 21 to the bottom part 11.

The spring-elastic retaining elements 16 have a rectangular cross section, for instance, and extend with their axial portion 19 in the direction of the motor pivot axis 5 in such a way that in the position of repose of the electric motor 1, the axial portions 19, both in the radial direction and the circumferential direction, have a radial spacing from the receiving opening 8 of the receiving housing 9 and the motor housing 2 and can also execute motion freely in the circumferential direction. Together with the retaining ring 18, the retaining disk 21 and the receiving housing 9, the retaining element 16, for instance three in number offset from one another by 120°, form a retaining device for the electric motor 1 that allows a torsional motion of the electric motor 1 relative to the receiving housing 2. The receiving housing 9 and the retaining elements 16 are made of plastic, for instance, and the retaining elements 16, retaining ring 18 and retaining 21 are embodied integrally in one component. The spring-elastic retaining elements 16, together with the electric motor 1, form a so-called spring-mass vibration system, which upon excitation of the electric motor 1 is set into torsional vibration that leads to undesired noise in the motor vehicle. The spring rate of the retaining elements 16 is selected such that taking into account the mass of the electric motor 1, a low-frequency (for instance, 10 Hz) resonant frequency results. When the electric motor is driven for instance at 50 Hz, the disturbing vibrations to be decoupled are then in the so-called supercritical range, far above this resonant frequency, and are optimally decoupled toward the motor vehicle. The result is a torsional motion of the electric motor 1 about the second ends 20 of the retaining elements 16.

Figure 4:
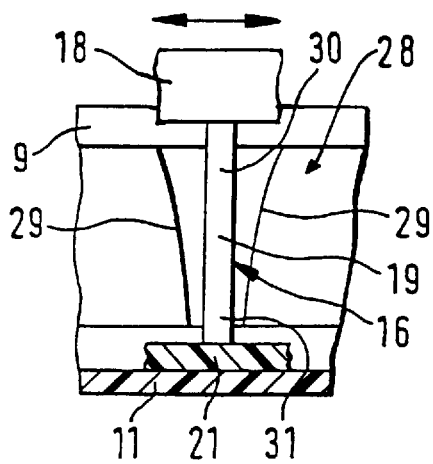
FIG. 4 is a section taken along the line IV—IV of FIG. 3.
Figure 5:
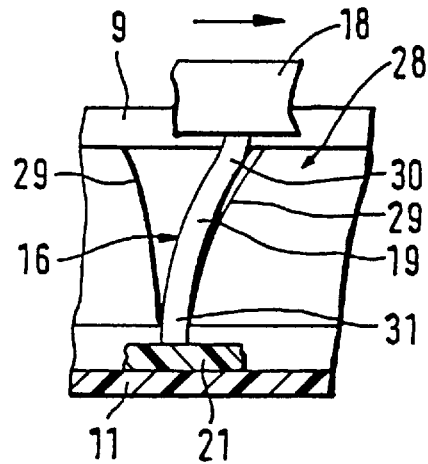
FIG. 5 is a section taken along the line V—V of FIG. 3.

However, there are also operating states, for instance upon acceleration from outside from shocks and impacts during motor vehicle operation or when the electric motor 1 is started up or stopped, in which the natural resonant frequency of the spring-mass vibration system, comprising the retaining elements 16 and the electric motor 1, is traversed, so that noise development at high torsional amplitudes can occur, which can also entail damage. In the region of each retaining element 16 on the receiving housing 9, a stop element 28 is therefore provided, which upon a clockwise or counterclockwise rotation limits the amplitude of the torsional motion of the retaining elements 16 relative to the receiving housing 9 by means of two stop faces 29, facing one another. The stop elements 28 may be embodied integrally as U-shaped recesses in the receiving opening 8 of the receiving housing 9, or as part of the receiving housing 9, or the stop elements 28 may be disposed as individual separate U-shaped parts in the receiving opening 8 of the receiving housing 9 and secured to that housing. As shown in FIG. 4, the stop faces 29 of the stop elements 28 extend such that the two stop faces 29 facing one another are spaced apart by a lesser distance, in the region of the second end 20 of the axial portion 19 of the retaining elements 16, than in the region of the first end 17 of the retaining elements 16, so that upon a vibrational motion, a first portion 30 of the axial portion 19 toward the first end 17 of the retaining element 16 comes to rest with a greater amplitude on the stop face 29 than a second portion 31 of the axial portion 19 toward the second end 20. Thus the disposition of stop elements 28 with stop faces 29 assures protection of the retaining device in the case of resonance or influences from outside, since if such conditions occur, upon a torsional motion, the retaining elements 16 are gently caught by the stop faces 29 and guarded against a destructive overload. In the exemplary embodiment of FIG. 5 the contour of the two stop faces 29 of a stop element 28 is curved in such a way that toward the first end 17 of the retaining element 16, they have a greater spacing from one another than toward the second end 20 of the retaining element; the course of the contour of each stop face 29 is selected such that the second portion 31 of the axial portion 19 already comes to contact the stop face 29 at a lesser amplitude of the torsional motion, so that the spring rate or spring stiffness of the first portion 30, which can still execute a greater amplitude of torsional motion until it contacts the stop face 29, increases and in particular has a progressively increasing course. Thus the spring characteristics of the retaining elements 16 and the maximum possible deflection of the electric motor 1 upon a torsional motion can be optimally designed to avoid an overload on the retaining device.

Figure 3:
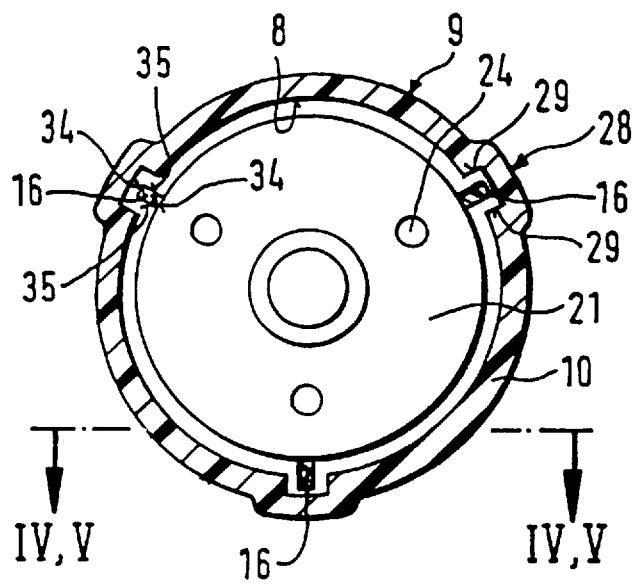
FIG. 3 is a section taken along the line III—III of FIG. 1.
Figure 6:
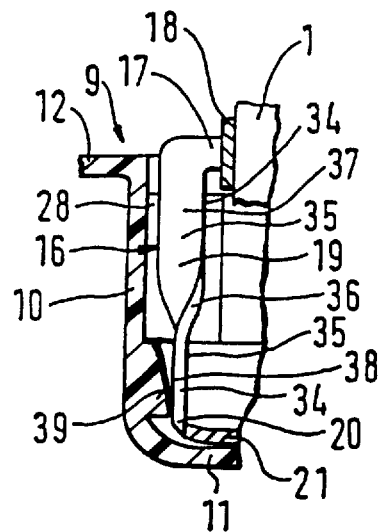
FIG. 6 is a fragmentary view of a retaining device with a stop element acting in the radial direction.

As shown in FIG. 3, the retaining elements 16 have a rectangular cross section with two short transverse sides 34, which are oriented toward the receiving housing 9 and the motor housing 2, and two longer longitudinal sides 35, which are each oriented toward one of the stop faces 29 of the stop element 28 and in other words extend radially. As already noted, the retaining elements 16, the retaining ring 18 and the retaining disk 21 may be made from plastic, but they may also be made of metal as individual parts, as shown in FIG. 6, and then joined together by welding or soldering. A change in this spring geometry of the retaining element 16 in various directions is attainable by varying the cross-sectional geometry of the retaining element 16. To that end, the retaining element 16, for instance, embodied with a rectangular cross section is provided with a transposition 36 in its axial portion 19 that subdivides the axial portion into a first sub portion 37, which is oriented toward the first end 17, and second sub portion 38, oriented toward the second end 20. In the first subportion 37 the transverse sides 34, and in the second subportion 38 the longitudinal sides 35, face the motor housing 2 and the receiving housing 9, as a result of which the second subportion of the retaining element 16 is embodied resiliently in the radial direction, while the first subportion 37 resiliently enables torsional motions. The transposition 36 provided in FIG. 6 is independent of the choice of material, for retaining elements 16 made from plastic or metal. To limit the radial amplitude of the retaining element 16, a transverse stop face 39, oriented toward the motor housing 2 on the stop element 28, for instance, is provided, which extends for instance in the region of the second subportion 38 and is spaced apart by a decreasing spacing relative to the retaining element 16 in the direction from the first end 17 of the retaining element 16 toward the second end 20 thereof.

The foregoing relates to a preferred exemplary embodiment of the invention, it being understood that other variants and embodiments thereof are possible within the spirit and scope of the invention, the latter being defined by the appended claims.

What is claimed is:

1. A retaining device for an electric motor, in particular an electric motor for a blower, comprising a receiving housing that has a receiving opening, a motor housing of the electric motor extends into said receiving opening coaxially to a pivot axis of the motor, said motor housing protrudes with radial spacing at least partway, and includes at least three spaced-apart spring-elastic retaining elements, each of said retaining elements have one first end and one second end, in which the retaining elements (16), between the first end (17) and the second end (20), have at least one axial portion (19), which extends in a direction of the motor pivot axis (5), wherein the retaining elements are joined by their first ends to the motor housing and by their second ends to the receiving housing which allows a vibrational motion of the electric motor relative to the receiving housing, a stop element (28) limits the amplitude of a vibrational motion of the electric motor (1) relative to the receiving housing (9) in a region of each retaining element (16) on the receiving housing (9).

2. The retaining device according to claim 1, in which the stop element (28) has two stop faces (29) facing one another, which upon clockwise or counterclockwise rotation limit a torsional motion of the electric motor (1).

3. The retaining device according to claim 2, and the stop faces (29) extend in such a way that upon a torsional motion, a first portion (30) of the axial portion (19) oriented toward the first end (17) of the retaining element (16) comes to contact the stop face (29) with a greater amplitude than a second portion (31), oriented toward the second end (20), of the axial portion (19).

4. The retaining device according to claim 3, in which the two stop faces (29), facing one another, of the stop element (28) extend in curved fashion, in such a way that toward the first end (17) of the retaining element (16), the two stop faces have a greater spacing from one another than toward the second end (20) of the retaining element (16).

5. The retaining device according to claim 4, in which the axial portion (19) of the retaining element (16) has a rectangular cross section, with two transverse sides (34) and two longitudinal sides (35) which are longer than the transverse sides, and is subdivided by a transposition (36) into a first subportion (37), which is oriented toward the first end (17), and a second subportion (38), which is oriented toward the second end (20), and in the first subportion (37) the transverse sides (34) and in the second subportion (38) the longitudinal sides (35) face the motor housing (2) and the receiving housing (9).

6. The retaining device according to claim 3, in which the axial portion (19) of the retaining element (16) has a rectangular cross section, with two transverse sides (34) and two longitudinal sides (35) which are longer than the transverse sides, and is subdivided by a transposition (36) into a first subportion (37), which is oriented toward the first end (17), and a second subportion (38), which is oriented toward the second end (20), and in the first subportion (37) the transverse sides (34) and in the second subportion (38) the longitudinal sides (35) face the motor housing (2) and the receiving housing (9).

7. The retaining device according to claim 2, in which the stop element (28) has a transverse stop face (39), toward the motor housing (2), which has a decreasing spacing from the retaining element (16) in the direction extending from the first end (17) of the retaining element (16) to the second end (20).

8. The retaining device according to claim 2, in which the stop element (28) is embodied integrally on the receiving housing (9).

9. The retaining device according to claim 2, in which the stop element (28) is connected as an independent part to the receiving housing (9).

10. The retaining device according to claim 2, in which the first ends (17) of the retaining elements (16) are joined to a tubular retaining ring (18), which embraces the motor housing (2) and can be fixed on the motor housing (2).

11. The retaining device according to claim 10, in which the retaining elements (16) are made of plastic integrally with the retaining ring (18).

12. The retaining device according to claim 1, in which the stop element (28) has a transverse stop face (39), toward the motor housing (2), which has a decreasing spacing from the retaining element (16) in the direction extending from the first end (17) of the retaining element (16) to the second end (20).

13. The retaining device according to claim 1, in which the stop element (28) is embodied integrally on the receiving housing (9).

14. The retaining device according to claim 1, in which the stop element (28) is connected as an independent part to the receiving housing (9).

15. The retaining device according to claim 1, in which the receiving housing (9) is cup-shaped, with an annular cylindrical part (10) and a radially extending bottom part (11), and the second end (20) of each retaining element (16) is joined to the bottom part (11).

16. The retaining device according to claim 15, in which the second ends (20) of the retaining elements (16) are joined to a retaining disk (21), which extends parallel to the bottom part (11) of the receiving housing (9) and can be fixed to the bottom part (11).

17. The retaining device according to claim 16, in which the retaining elements (16) are made of plastic integrally with the retaining disk (21).

18. The retaining device according to claim 1, in which the first ends (17) of the retaining elements (16) are joined to a tubular retaining ring (18), which embraces the motor housing (2) and can be fixed on the motor housing (2).

19. The retaining device according to claim 18, in which the retaining elements (16) are made of plastic integrally with the retaining ring (18).

20. The retaining device according to claim 19, in which the retaining elements (16) are made of plastic integrally with the retaining disk (21).

* * * * *